United States Patent [19]

Hibi et al.

[11] Patent Number: 5,388,917
[45] Date of Patent: Feb. 14, 1995

[54] SPINDLE UNIT

[75] Inventors: Kenji Hibi, Yoro; Masatsugu Mori, Yokkaichi; Yoshimi Ohta, Mie, all of Japan

[73] Assignee: NTN Corporation, Osaka, Japan

[21] Appl. No.: 127,608

[22] Filed: Sep. 28, 1993

[30] Foreign Application Priority Data

Oct. 14, 1992 [JP]  Japan ............................ 4-71689[U]
Oct. 14, 1992 [JP]  Japan ............................ 4-71718[U]
Oct. 30, 1992 [JP]  Japan ............................ 4-293201

[51] Int. Cl.⁶ ....................... F16C 35/12; F16C 27/00
[52] U.S. Cl. ....................................... 384/517; 384/493
[58] Field of Search ............... 384/517, 518, 563, 493, 384/557, 556, 519, 583, 905

[56] References Cited

U.S. PATENT DOCUMENTS

| | | | |
|---|---|---|---|
| 3,620,586 | 11/1971 | Maastricht | 384/563 X |
| 3,943,803 | 3/1976 | Hafla | 384/563 X |
| 4,023,868 | 5/1977 | Miki | 384/563 |
| 4,551,032 | 11/1985 | Mottershead | 384/517 |
| 4,611,934 | 9/1986 | Piotrowski et al. | 384/517 |
| 5,051,005 | 9/1991 | Duncan | 384/517 |

*Primary Examiner*—Thomas R. Hannon
*Attorney, Agent, or Firm*—Nikaido, Marmelstein, Murray & Oram

[57] ABSTRACT

A spindle unit which can offset any displacement of the spindle due to thermal expansion and which can adjust the preload on the bearings according to the revolving speed of the spindle. Between the outer casing and the spindle are provided a high-rigidity elastic member and a pressure chamber connected to an oil pressure control valve. A displacement sensor provided at the end of the spindle and a tachometer are connected to the pressure control valve. As the revolving speed of the spindle increases, oil pressure is introduced into the pressure chamber to reduce the preload. By reducing the preload, the spindle moves axially, thus offsetting its displacement due to thermal expansion.

5 Claims, 9 Drawing Sheets

SPINDLE UNIT

The present invention relates to a spindle unit.

A spindle unit for use in a machine tool is required to have a large supporting rigidity for the spindle while the spindle is rotating at a low speed and the function of restraining temperature rise of the spindle rather than a high rigidity while it is rotating at a high speed.

In a conventional structure for supporting the spindle of a machine tool, a preload is usually applied to the bearings supporting the spindle with the bearings held in fixed positions. With such a fixed-position preloading system, it is impossible to increase the preload level enough to rigidly support the spindle while the rotating speed is low. In contrast, if the preload is set to high value for low speed, the bearing temperature would rise so high at high speed that the spindle speed cannot be increased to a sufficient level.

In contrast, there are known spindle units which have a preload changeover mechanism in the spindle so that the preloading level can be changed over according to the operating conditions of the spindle.

One of such spindle units is disclosed in Japanese Utility Model Application 2-115041. This unit is so adapted that the preload can be changed over according to the rotating speed of the spindle.

As shown in FIG. 12, this prior art spindle unit comprises an outer casing 51, a bearing housing 55 movably mounted in the outer casing 51 to axially urge bearings 53, 54, and a spindle 52 supported by the bearings 53, 54. Between the outer casing 51 and the bearing housing 55 are provided an elastic member 56 having a larger rigidity than the axial rigidity of the bearings 53, 54 and a pressure chamber 57. A high-pressure fluid is introduced into and discharged from the pressure chamber 57. A large initial preload is applied to the bearings 53, 54 by the spring force of the elastic member 56. The bearing housing 55 is biased toward the elastic member 56 by the pressure of the fluid introduced into the pressure chamber 57. By adjusting the fluid pressure, the preload applied to the bearings 53, 54 can be controlled.

But a preload changeover type spindle unit has the following problems:

1) Though it can sufficiently cope with high-speed operation, it cannot prevent displacement of the end of the spindle mounted on the tool due to changes in preload and revolving speed (thus in the spindle temperature). Thus, in order to maintain high machining accuracy, it is necessary to correct the displacement of the spindle end while the spindle is being driven.

2) Heretofore, a preloading range within which the preload can be changed was determined based on the predetermined revolving speed and rigidity of the spindle of a machine tool. The preload is determined within this range taking various factors into consideration. Such factors include numerical values inferred from experience and estimates obtained by technical calculations.

Thus, if the temperature fluctuation of the bearing rings and the centrifugal force should deviate from the estimated values while the spindle is being driven, the actual preload will also deviate from the predetermined value. This makes preload adjustment difficult.

Further, in determining the actual preload value, no consideration is given to such factors as fluctuations in the external loads that act on the spindle such as cutting forces and changes in the temperature balance among the component parts of the unit. Thus, the machining accuracy may become unstable due to chattering or change in tool position.

3) With the prior art spindle unit, in order to change the initial preload on the bearings 53, 54, it is necessary to change the rigidity of the elastic member 56. But it is mounted inside the unit behind the bearings 53, 54. Thus, in order to replace it, the bearings 53, 54 and the bearing housing 55 have to be removed from the outer casing 51. This is practically nothing different from totally disassembling the entire unit and thus is very troublesome.

4) The bearing housing 55 and the outer casing 51 are fitted together with a small clearance defined therebetween. If they are deformed to different extents from each other due to difference in temperatures therebetween that may occur during machining operation, they may be pressed too tightly against each other. This will hinder smooth movement of the bearing housing 55, thus making stable preload adjustment difficult. But if a large clearance is provided therebetween to prevent them from being tight-fitted, the rigidity of the spindle will drop.

It is an object of this invention to provide spindle units which can adjust the preload on the bearings stably and smoothly.

In order to attain this object, there is provided, from one aspect of this invention, a spindle unit comprising an outer casing, a spindle mounted in the outer casing so as to be axially movable within a predetermined range with respect to the outer casing, bearings for supporting the spindle, preload changeover means provided between the outer casing and the spindle for adjusting axial biasing forces applied to the bearings, and control means for adjusting the biasing force applied to the bearings by the preload changeover means according to the axial displacement of the spindle.

In the assembled state, a heavy initial load is applied to the bearings. As the spindle revolving speed increases and its temperature rises, it will displace in an axial direction due to thermal expansion. In this state, the preload changeover mechanism urges the bearings in the direction opposite to the direction in which the initial heavy load is applied to reduce the preload on the bearings and thus to move the spindle rearward to counteract the axial displacement of the spindle due to thermal expansion.

The preload on the bearings is adjustable and the spindle can be moved axially according to the changing preload. Thus, axial displacement of the spindle can be kept to a minimum over a wide range of the revolving speed of the spindle. The machining accuracy thus improves.

From another aspect of this invention, there is provided a spindle unit comprising an outer casing, a spindle mounted to extend through the outer casing, bearings for supporting the spindle, a bearing housing mounted in the outer casing for urging the bearings in an axial direction, an elastic member having a rigidity larger than the axial rigidity of the bearings, a pressure chamber into which is introduced a pressure fluid, the bearing housing being urged in one axial direction by the elastic member and in the other axial direction by the fluid pressure in the pressure chamber, detecting means for detecting the displacement of the elastic member, and control means receiving signals from the detecting means and controlling the pressure level of the fluid to be introduced into the pressure chamber according to the signals.

The actual preload on the bearings during machining is detected by detecting the displacement of the elastic member. The fluid pressure in the pressure chamber is adjusted to control the actual preload. Also, by detecting the deflection of the elastic member, tool damage and chattering can be detected. Thus, such phenomena can be eliminated by adjusting the machining conditions and preload.

Since the fluid pressure in the pressure chamber can be adjusted according to the displacement of the elastic member, the preload on the bearings can be adjusted accurately to a predetermined value. Thus, the rigidity of the spindle can be kept at an optimum value.

Further, by the provision of means for detecting the deflection of the elastic member, any external factor that acts on the spindle or any change in the working environment can be detected, any trouble of the spindle unit can be detected reliably. Thus, the spindle can be operated stably.

From still another aspect of this invention, there is provided a spindle unit comprising an outer casing, a spindle mounted to extend through the outer casing, bearings for supporting the spindle, a bearing housing mounted in the outer housing for urging the bearings in an axial direction, an elastic member having a rigidity larger than the axial rigidity of the bearings, and a pressure chamber into which is introduced a pressure fluid, the bearing housing being urged in one axial direction by the elastic member and in the other axial direction by the fluid pressure in the pressure chamber, the elastic member being in contact with the bearing housing, a presser member detachably mounted on the bearing housing for pressing the elastic member against the bearing housing, the elastic member being located at one end of the outer casing when the spindle unit is assembled.

In this arrangement, merely by removing the presser member from the bearing housing, the elastic member is accessible. Thus, it can be replaced with a different one without removing the bearings from the spindle.

From yet another aspect of the invention, there is provided a spindle unit comprising an outer casing, a spindle mounted to extend through the outer casing, bearings for supporting the spindle, a bearing housing mounted in the outer casing for urging the bearings in an axial direction, an elastic member having a rigidity larger than the axial rigidity of the bearings, a pressure chamber into which is introduced a pressure fluid, the bearing housing being urged in one axial direction by the elastic member and in the other axial direction by the fluid pressure in the pressure chamber, one of the outer casing and the bearing housing being provided at the boundary therebetween with a groove that surrounds the boundary, and means communicating with the groove for supplying a pressure fluid.

In this arrangement, by applying a fluid pressure to the groove formed between the outer casing and the bearing housing, the diameter of the bearing housing decreases, so that a gap is formed therebetween. Thus, the bearing housing can be moved smoothly.

Since a gap can be formed freely between the outer casing and the bearing housing after assembling the spindle unit, it is not necessary to provide an unduly large clearance when fitting them together. It is even possible to tight-fit them together. This also contributes to increased rigidity of the spindle.

Other features and objects of the present invention will become apparent from the following description made with reference to the accompanying drawings, in which.

Now we will describe the embodiments of this invention with reference to the accompanying drawings.

FIRST EMBODIMENT

Figure 1:
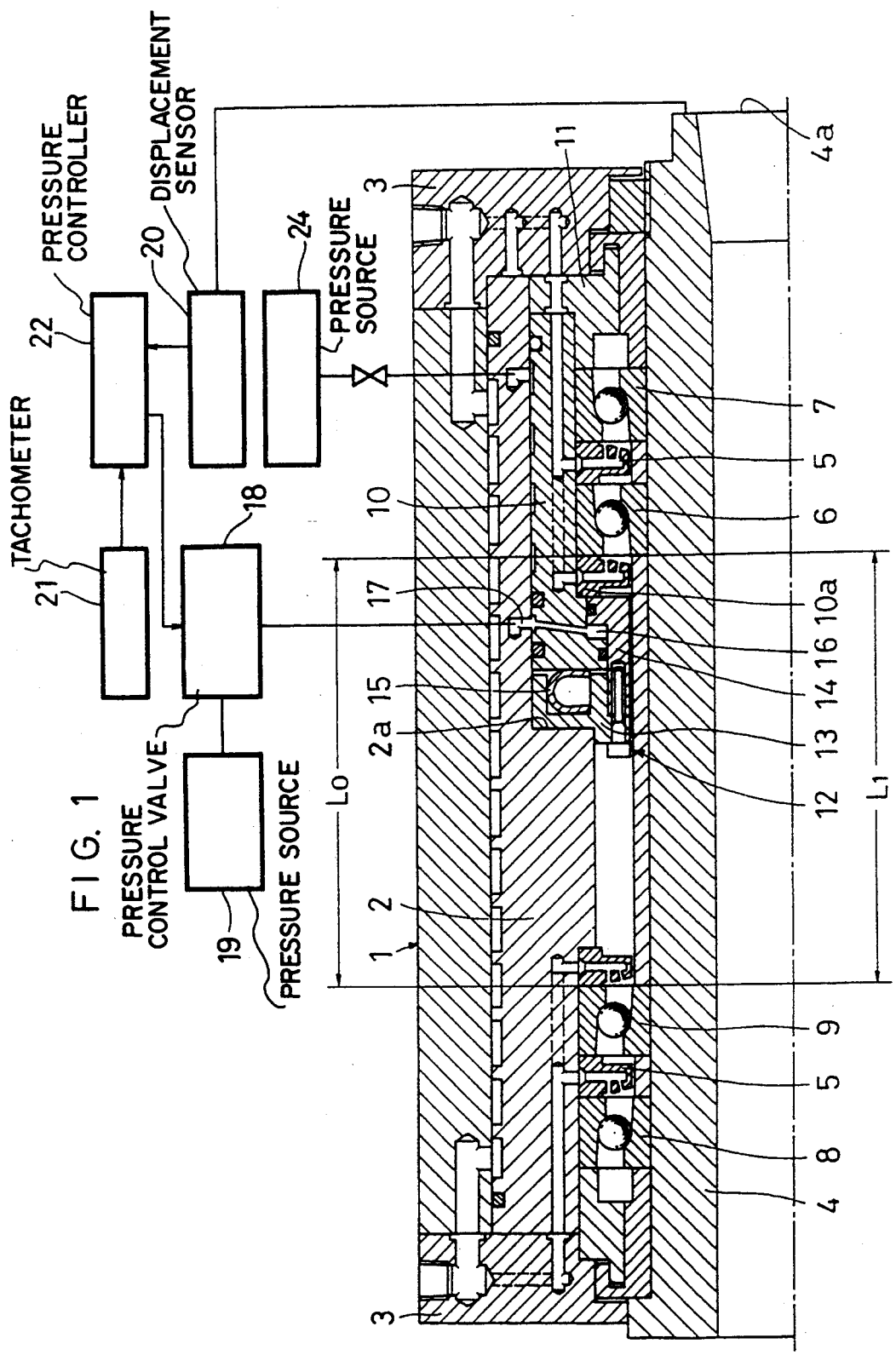
FIG. 1 is a sectional view of the first embodiment.
Figure 2:
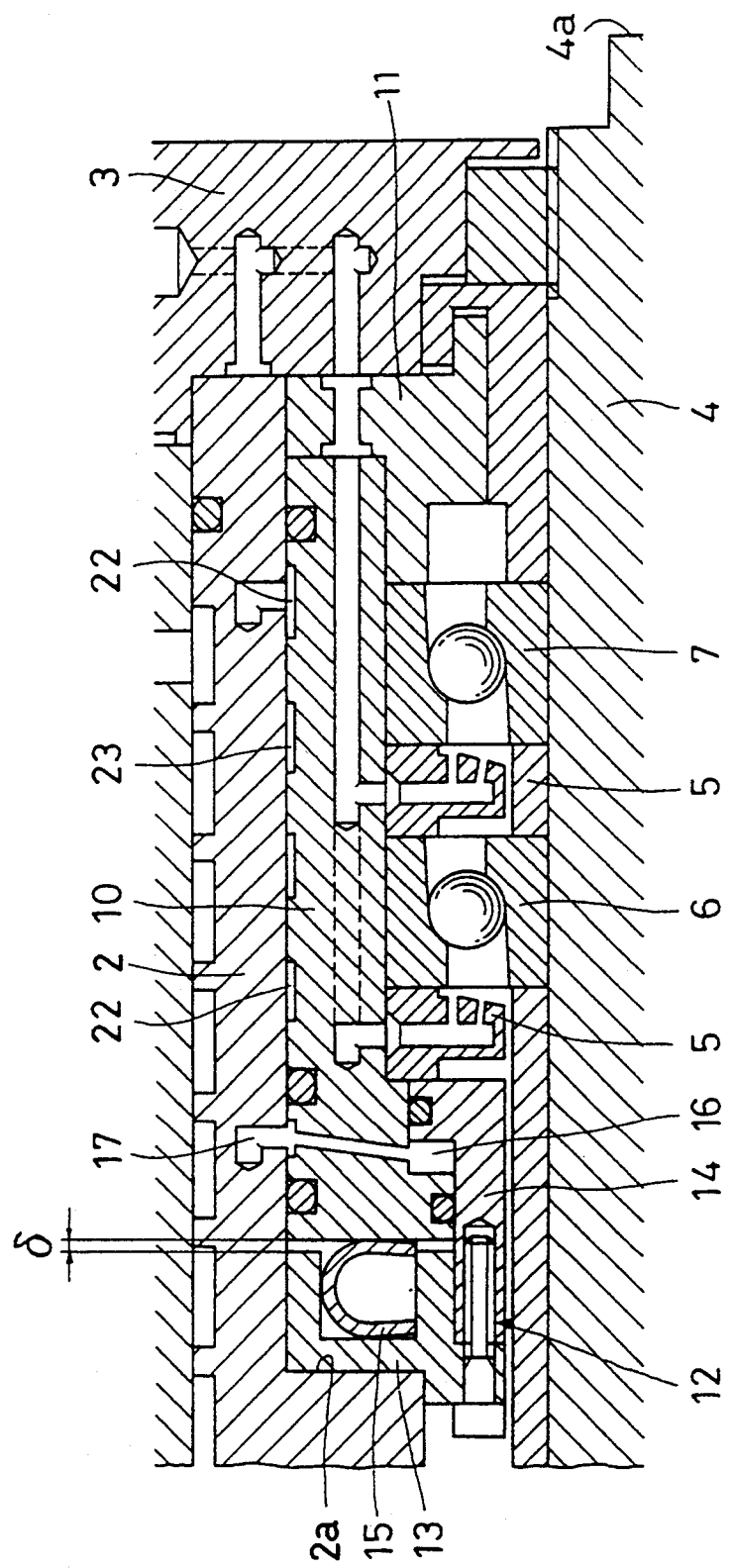
FIG. 2 is an enlarged sectional view of a portion of the same.

As shown in FIGS. 1 and 2, an outer casing 1 comprises a cylindrical casing body 2 and lid members 3 mounted on both ends of the body 2. A spindle 4 extends through the outer casing 1.

The spindle 4 is rotatably supported by pairs of angular ball bearings 6, 7 and 8, 9 which are arranged in a back-to-back relation, with each pair disposed in parallel through a spacer 5. In the figure, the righthand end 4a of the spindle 4 is the side at which a cutting tool is mounted (machining side).

The bearings 6, 7 near the machining side have their inner rings fixed to the spindle 4. Their outer rings are disposed in a bearing housing 10 mounted between the bearings 6, 7 and the casing body 2. The bearings 8, 9 on the other side have their inner rings fixed to the spindle 4 and their outer rings fixed to the casing body 2. The spindle 4 is axially movable relative to the casing body 2 by a distance equal to the distance by which the inner rings of the bearings 6–9 are movable relative to the respective outer rings.

The bearing housing 10 is movably fitted in the inner surface of the casing body 2. The bearings 6, 7 are sandwiched between a shoulder 10a provided on the inner surface of the bearing housing 10 and a member 11 mounted on one end of the housing 10. Thus, when the bearing housing 10 moves axially, the outer rings of the bearings 6, 7 are pushed, so that preloads are applied to the bearings 6–9. The preloading force is determined by the difference between the distance L1 between the inner rings of the bearing pairs 6, 7 and 8, 9 and the distance L0 between their outer rings.

An adjusting member 12 provided in the bearing housing 10 is positioned against an inner end face 2a of the casing body 2 (FIG. 2). It comprises a spring support 13 carrying an elastic member 15 and a ring 14 inserted in the bearing housing 10. These members 13, 14 are coupled together by bolts.

The elastic member 15 is an annular spring having a U-shaped section and having a spring constant set to a larger value than the axial rigidity of the bearings 6–9. Once mounted in the spindle unit, it serves to eliminate any axial gap in each bearing and apply a large initial preload to the bearings.

The width of the spring support 13 is determined such that a gap $\delta$ is provided between the spring support 13 and the bearing housing 10 with the elastic member 15 mounted. In order to prevent plastic deformation of the elastic member 15, the gap $\delta$ is so set as not to allow the elastic member 15 to be compressed beyond its elastic limit.

A pressure chamber 16 is formed between the bearing housing 10 and the ring 14. A passage 17 is formed inside the casing body 2. It communicates on one hand with the pressure chamber 16 and on the other with a pressure source 19 (FIG. 1) for feeding high-pressure oil through a pressure control valve 18.

To the machining end 4a of the spindle 4 is coupled a displacement sensor 20 for sensing the axial displacement of the machining end (FIG. 1). The signals from the displacement sensor 20 and a tachometer 21 for sensing the revolving speed of the spindle 4 are inputted in a pressure controller 22. Upon receiving the signals from the sensors 20, 21, the pressure controller 22 calculates the oil pressure necessary to attain a predetermined preload and sends to the pressure control valve 18 the signal to control the oil pressure applied to the pressure chamber 16.

In the abovesaid spindle unit, the distance L0 between the opposite faces of the outer rings of the bearings 6, 9 is determined so that the elastic member 15 is compressed when the spindle unit is assembled. The initial preload on the bearings 6–9 is equal to the elastic force of the elastic member 15 which corresponds to the amount of deflection of the elastic member. By introducing a high-pressure oil into the pressure chamber 16 in this state, the bearing housing 10 will be pushed by the oil pressure in such a direction as to further compress or deflect the elastic member 15, thus reducing the preload on the bearings 6–9. Due to the reduction in preload on the bearings as well as the movement of the bearing housing 10, the inner rings and the outer rings of the bearings 6–9 will move relative to each other. This causes the machining end 4a of the spindle 4 to move rearwards with respect to the end of the outer casing 1.

Figure 3:
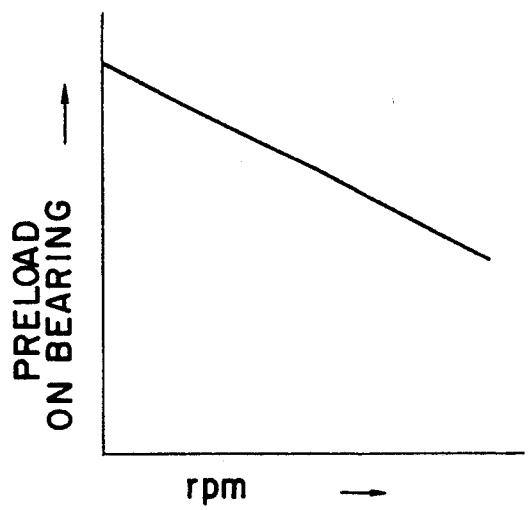
FIG. 3 is a graph showing the relation between preload on the bearings and the revolving speed of the spindle.

FIG. 3 shows how the preload on the bearings 6–9 changes when the oil pressure to the pressure chamber 16 is continuously changed in proportion to the number of revolutions.

Figure 4:
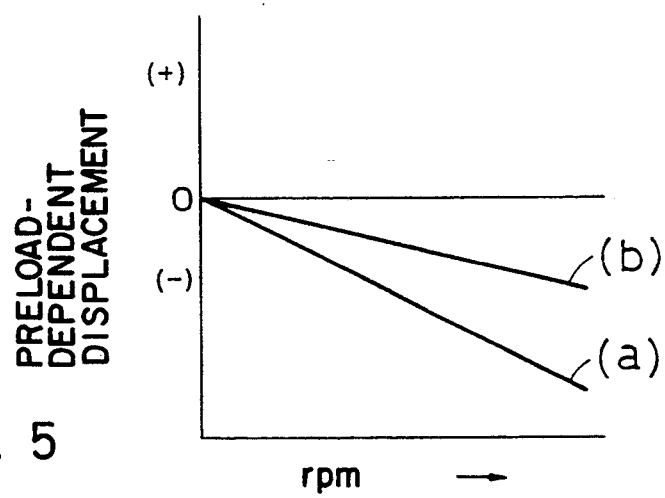
FIG. 4 is a graph showing the relation between the axial displacement of the spindle due to change in preload and the revolving speed of the spindle.

FIG. 4 shows that with increase in the number of revolutions of the spindle per unit time, the axial displacement (a) of the bearing box 10 and the axial displacement (b) of the end 4a of spindle 4 increase in the minus direction, i.e. withdrawal direction.

Figure 5:
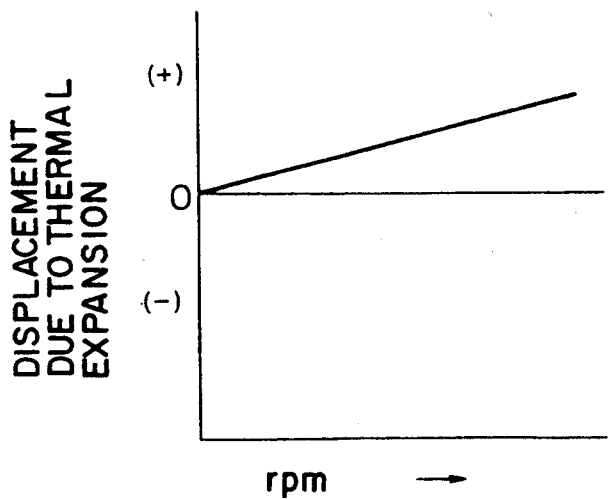
FIG. 5 is a graph showing the relation between the axial displacement of the spindle due to thermal expansion and the spindle revolving speed.

On the other hand, as the number of revolutions of the spindle 4 increases, the spindle temperature rises and its length increases due to thermal expansion. Thus, as shown in FIG. 5, the machining end 4a of the spindle 4 will move in the plus direction and protrude from the casing with increase in the number of revolutions.

Thus, in actual operation of the spindle, while the spindle is rotating at low speed, during which high rigidity is required, the oil pressure is discharged from the pressure chamber 16 so that an initial heavy load is exerted on the bearings 6–9 by the biasing force of the elastic member 15.

When the revolving speed of the spindle 4 increases to an intermediate level and the displacement sensor 20 senses any axial elongation of the spindle 4 due to thermal expansion, oil pressure is introduced into the pressure chamber 16 to reduce the preload to an intermediate level by axially urging the elastic member 15. The spindle end 4a thus moves in the minus direction, offsetting the displacement in the plus direction due to thermal expansion. The displacement of the spindle 4 is thus kept at zero.

As the rotation of the spindle 4 increases to a high-speed region, the displacement of the spindle end increases due to thermal expansion. Thus, larger oil pressure is introduced into the pressure chamber 16 to reduce the preload on the bearings still further. This causes a larger displacement of the spindle end 4a in the minus direction, offsetting its displacement in the plus direction due to thermal expansion.

Since the oil pressure introduced into the pressure chamber 16 is adjustable by monitoring the displacement of the spindle 4 with the displacement sensor 20, the displacement of the spindle end 4a can be kept at zero within a wide range of revolving speed from the low-speed to high-speed region. This assures high machining accuracy.

Since the preload on the bearings is reduced as the revolving speed increases, the temperature of the bearings can be kept low. Thus, high-speed performance is excellent.

Further, in this embodiment, since the bearings 6–9 are held in position by the large biasing force of a highly rigid elastic member 15, the rigidity of the spindle is achieved so as to match the fixed-position preload.

In the above embodiment, the displacement of the spindle is monitored by the displacement sensor 20 to adjust the oil pressure. But if it is possible to know beforehand the relation between the oil pressure and the preload and the displacement of the spindle as shown in FIGS. 3 and 4, the displacement of the spindle end can be controlled to zero simply by adjusting the revolving speed and the oil pressure. In this case, the displacement sensor 20 can be done away with.

As a preload changeover mechanism, we showed the structure comprising the elastic member 15 and the pressure chamber 16 for urging the bearing housing 20. But another pressure chamber may be provided in place of the elastic member so as to urge the bearing housing in opposite directions by the oil pressures in the two pressure chambers. The preload changeover mechanism may be of any other type.

The fluid to be introduced into the pressure chamber 15 is not limited to high-pressure oil but may be high-pressure air or any other gas.

SECOND EMBODIMENT

Figure 6:
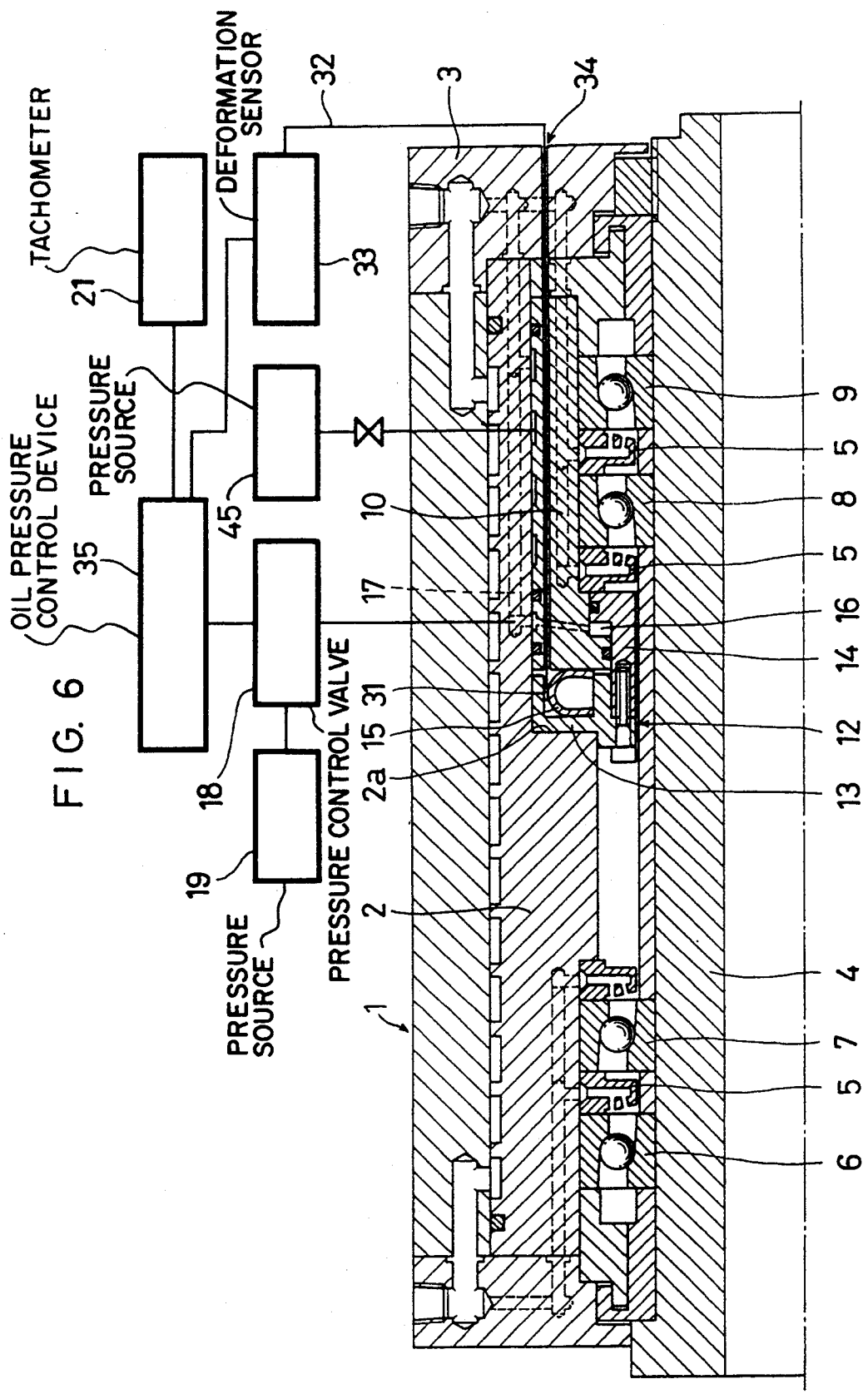
FIG. 6 is a sectional view of the spindle unit of the second embodiment.
Figure 7:
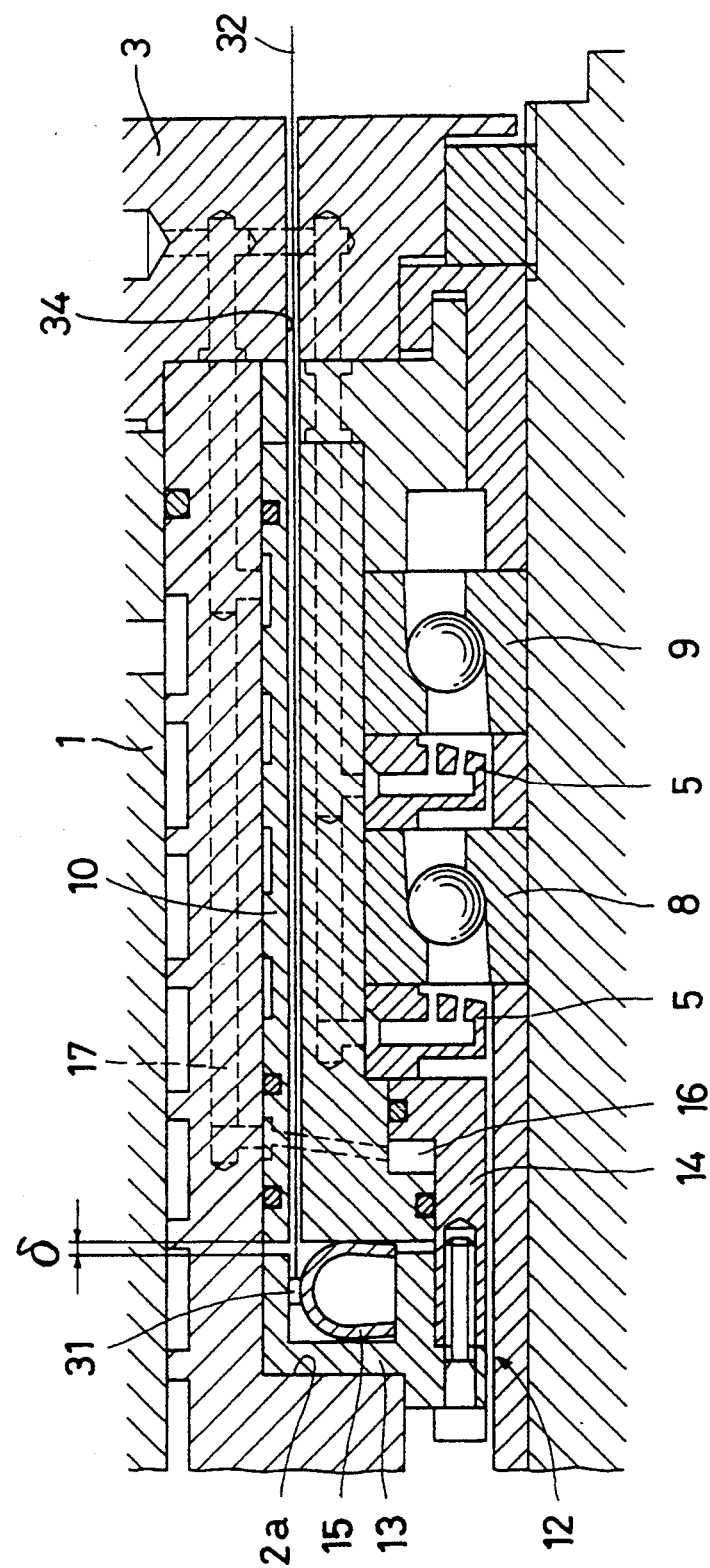
FIG. 7 is an enlarged sectional view of a portion of the same.

FIGS. 6 and 7 show the second embodiment. In this embodiment, the same parts as in the first embodiment are denoted by the same numerals and their description is omitted. We will only describe the characterizing parts of this embodiment.

The elastic member 15 is mounted between the inner end face 2a of the casing body 2 and the adjusting member 12. A strain gauge 31 is mounted on the elastic member 15. A lead 32 connected to the strain gauge 31 extends through an axial hole 34 formed in the bearing housing 10 and the lid member 3 and connected to a deformation sensor 33.

The pressure chamber 16 is defined between the bearing housing 10 and the ring 14 of the adjusting member 12. The pressure chamber 16 leads to the oil pressure source 19 through a pressure adjusting valve 18. An oil pressure control device 35 is connected to the pressure control valve 18.

The oil pressure control device 35 receives signals from the deformation sensor 33 and the spindle tachometer 21. Based on these signals, it calculates the oil pressure necessary to obtain a predetermined preload and activate the pressure control valve 18.

In this embodiment, when the spindle unit is assembled, the bearing housing 10 is biased rightwardly in FIG. 6 by the spring force of the elastic member 15. A heavy preload is thus applied to the bearings 6-9. When high-pressure oil is introduced into the pressure chamber 16 in this state to deform the elastic member 15, the bearing housing 10 is moved leftwardly. The preload on the bearings will decrease.

Figure 8:
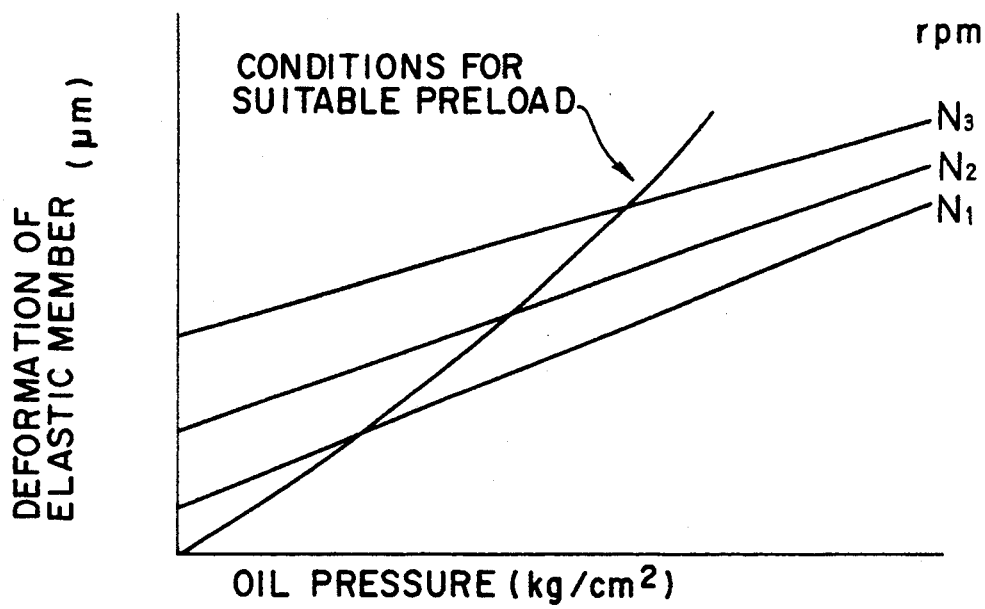
FIG. 8 is a graph showing the relation between the deformation of the elastic member and the oil pressure.

As shown in FIG. 8, firstly the relation between the oil pressure and the displacement of the elastic member is determined for each number of revolutions per unit time (rpm). Then, a suitable preload is determined e.g. in terms of amount of temperature increase. The oil pressure meeting the conditions is determined for each number of revolutions per unit time.

In the actual operation of the spindle, as the revolving speed of the spindle 4 increases, the preload on the bearings increases due to thermal expansion of the spindle and the centrifugal force that acts on the spindle. Such change in preload is converted into the movement of the bearing housing 10 and manifests itself in the form of a change in the amount of deformation of the elastic member 15.

If the actual deformation of the elastic member 15 while the spindle 15 is being driven should deviate from the oil pressure-deformation relation shown in FIG. 8, it is possible that the spindle is being influenced by some other factors than the thermal expansion of spindle and centrifugal force taken into account when designing the spindle. Namely, in this state, the preload on the bearings or the rigidity of the spindle while it is being driven may be higher or lower than the optimum preload or rigidity.

The oil pressure control device 35 calculates the oil pressure at which an optimum preload is attainable and controls oil pressure in the pressure chamber and thus the preload. In this way, the preload on the bearings during operation is always controlled so as to coincide with the predetermined optimum value.

Figure 9:
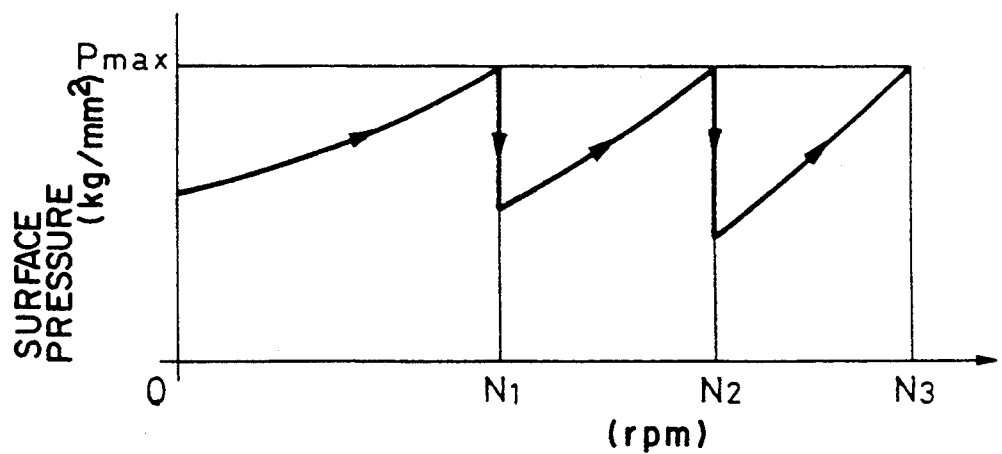
FIG. 9 is a graph showing the process of preload changeover.

In the actual changeover of preload, when the preload, which increases with increase in spindle revolving speed, reaches its permissible upper limit (Pmax) (N1) shown in FIG. 9, high-pressure oil is introduced into the pressure chamber 16, deforming the elastic member 15. The bearing housing 10 moves by a distance corresponding to the amount of deformation, reducing the preload. This preload changeover control is carried out in steps every time the preload reaches the permissible upper limit (revolving speeds N2 and N3). The rigidity of the elastic member 15 should be about half of the rigidity when the preload on the bearings has reached the maximum allowable level.

The oil pressure in the pressure chamber 16 may be continuously controlled according to change in the amount of deformation of the elastic member 15. This control has an advantage in that the preload can be maintained constant irrespective of change in the revolving speed.

The spindle of a machine tool may vibrate microscopically due to insufficient rigidity of the spindle, chattering or damage to the tool. Such microscopic vibrations are transmitted to the elastic member 15 through the bearings 6-9 and appear in the form of high-frequency vibration components in the signal from the deformation sensor 33 connected to the elastic member 15. Thus, by extracting such components of various frequencies from the sensor signal, any changes in machining conditions and working environment can be detected.

If signals resulting from insufficient rigidity of the spindle or chattering are detected in the vibration components of the sensor signal, the oil pressure in the pressure chamber 16 is adjusted so as to increase the preload on the bearings and thus the spindle rigidity. If the sensor signal indicates spindle trouble or tool damage, the machining conditions may be revised or the spindle may be stopped. Thus, the signal from the deformation sensor 33 can be used as a monitor for detecting any trouble of the spindle. This ensures a stable driving of the spindle.

THIRD EMBODIMENT

Figure 10:
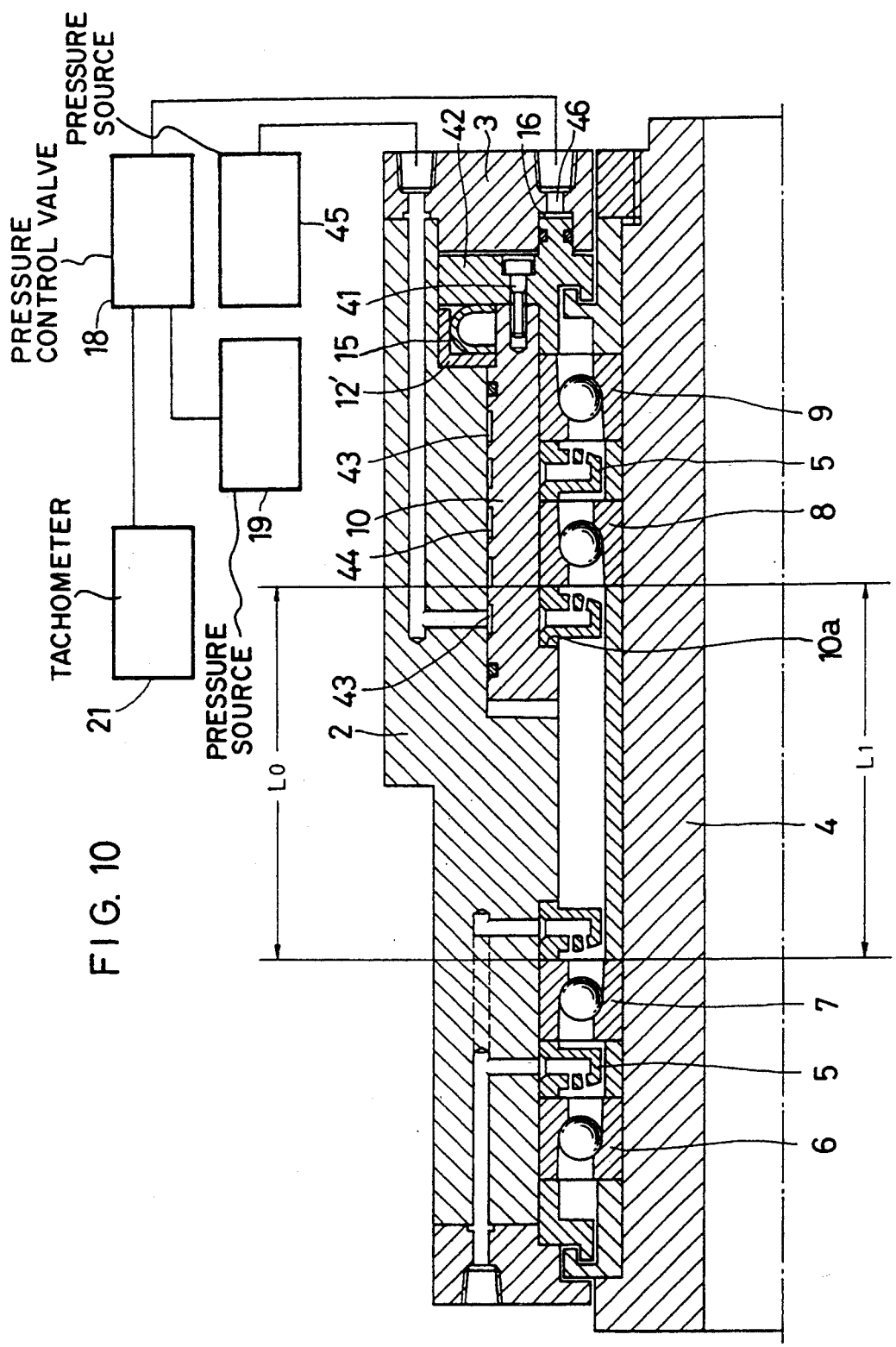
FIG. 10 is a sectional view of the spindle unit of the third embodiment.
Figure 11:
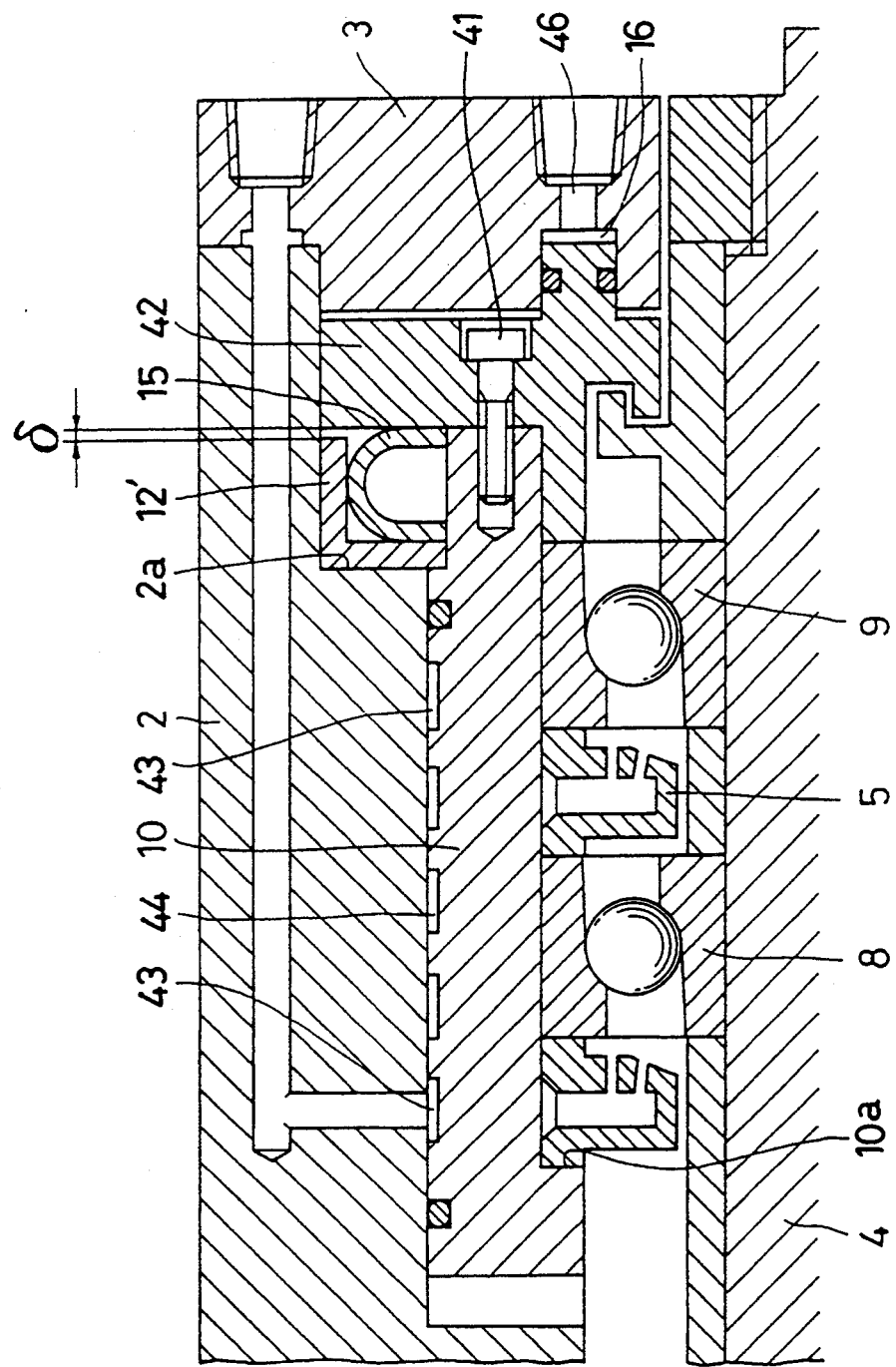
FIG. 11 is an enlarged sectional view of a portion of the same.
Figure 12:
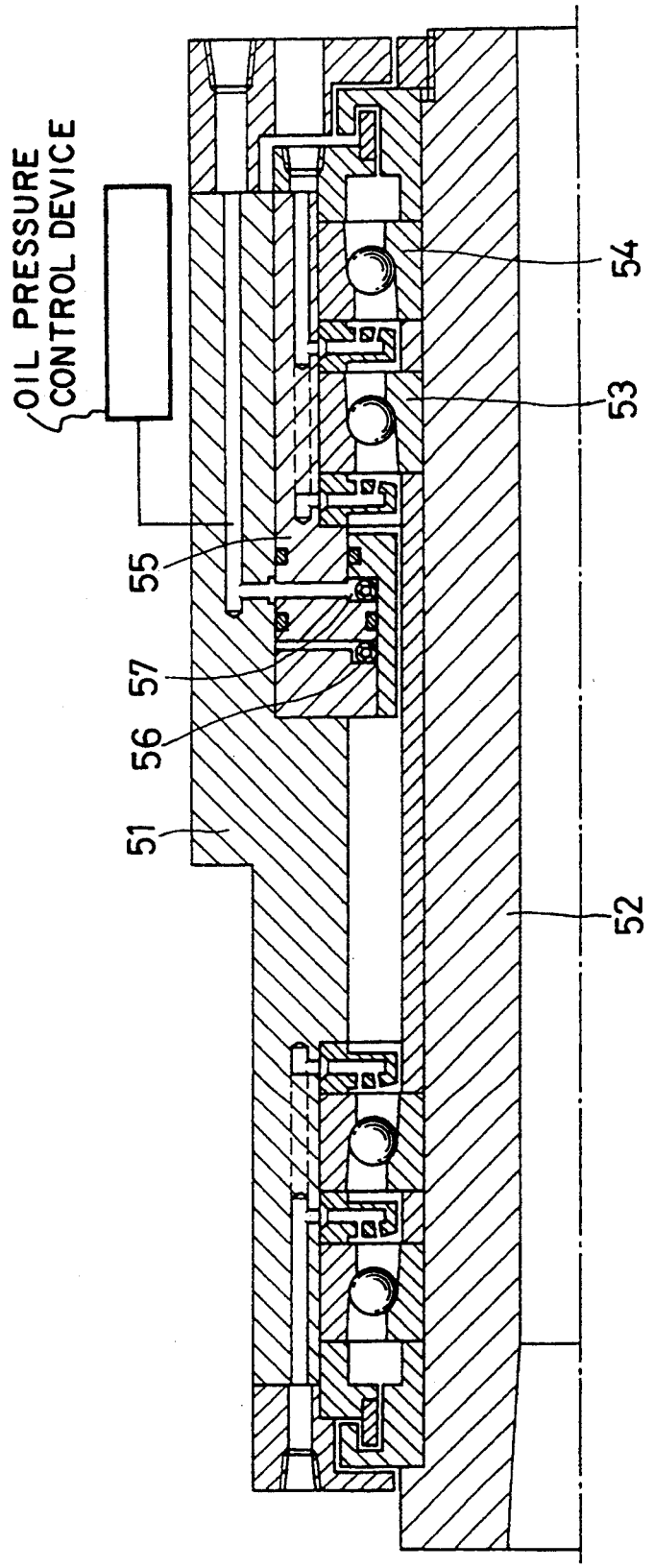
FIG. 12 is a sectional view of prior art.

FIGS. 10 and 11 show the third embodiment, in which the elastic member 15 and the pressure chamber 16 are provided at outer end side of the casing body 2 instead of at the central portion of the casing body 2 as in the previous embodiments.

As shown in FIG. 10, the bearing housing 10 is movably mounted on the inner surface of the casing body 2. A presser member 42 is bolted to one end thereof. The outer rings of the bearings 8 and 9 are sandwiched between the presser member 42 and the shoulder 10a provided at the other end of the bearing housing 10. The lid member 3 is detachably mounted on the end of the casing body 2 to prevent the presser member 42 from coming out.

The presser member 42 protrudes outwards (upwardly) from the outer surface of the bearing housing 10. An adjusting member 12' for adjusting the initial preload is mounted between the protruding end of the presser member 42 and the inner end face 2a of the casing body 2 (FIG. 11). The width of the adjusting member 12' is determined such that a gap $\delta$ is provided between the member 12' and the presser member 42 with the elastic member 15 mounted. In order to prevent plastic deformation of the elastic member 15, the gap $\delta$ has to be so set as not to allow the elastic member 15 to be compressed beyond its elastic limit.

A pressure chamber 16 is defined between the presser member 42 and the lid member 3. It communicates with a pressure source 19 through a passage 46 formed in the lid 3 and with a pressure control valve 18.

In the outer surface of the bearing housing 10 are provided circumferential grooves 43 completely encircling the housing 10 and a helical groove 44 having both ends connected to the circumferential grooves 43 at both ends. A pressure source 45 for supplying high-pressure oil communicates with one of the circumferential grooves 43 through a changeover valve. At the same time when oil pressure is introduced into the pressure chamber 16 from the pressure source 19 to adjust the preload, the other pressure source 45 is adapted to apply oil pressure to the one of the circumferential grooves 43.

The distance L0 between the outer rings of the bearings 6–9 is so set that the elastic member 15 is compressed when the spindle unit is assembled. With this arrangement, once the unit is assembled, a force corresponding to the amount of deflection of the elastic member 15 acts on the bearings as a preload. When high-pressure oil is introduced into the pressure chamber 16 in this state, the bearing housing 10 and the presser member 42 will move in such a direction as to further compress the elastic member, thus reducing the preload on the bearings.

In order to change the initial preload on the bearings, one has to change the spring constant of the elastic member 15 or the distance L0 between the bearings by changing the width of the adjusting member 12'. In this embodiment, by removing the lid member 3 from the casing body 2 and detaching the presser member 42 bolted to the bearing housing 10, the elastic member 15 is accessible and thus the elastic member 15 and the adjusting member 12' can be removed. Namely, these members can be replaced with different ones without the need of removing the bearings 8, 9 and the bearing housing 10 from the casing body 2. Thus, the initial preload on the bearings can be changed easily.

While the temperature of the spindle is low, there is a sufficient gap between the casing body 2 and the bearing housing 10. Thus, the bearing housing 10 can be moved smoothly. But if the spindle temperature rises with operation for a long time, the bearing housing 10 and the casing body 2 may be pressed tightly against each other due to a difference in thermal expansion amount therebetween. In such a case, the relation between the oil pressure and the amount of deflection of the elastic member 15 will change due to frictional forces produced between the outer casing and the bearing housing. This makes it difficult to adjust the preload with high accuracy.

In order to prevent this problem, when introducing oil pressure into the pressure chamber 16 to adjust the preload, a high oil pressure is introduced from the other pressure source 45 into the circumferential grooves 43 and helical groove 44. This causes a reduction in the diameter of the bearing housing 10, forming a gap between the housing 10 and the casing body 2. Thus, the bearing housing 10 can be moved smoothly, which in turn makes it possible to adjust the preload with high accuracy. Oil pressure is introduced into the circumferential grooves 43 and the helical groove 44 merely to momentarily eliminate the tight-fit state between the bearing housing and the outer casing. Thus, oil pressure may be supplied into these grooves only for a very short time.

Such circumferential grooves 43 and helical groove 44 may be formed in the inner surface of the outer casing 1, not in its outer surface.

What is claimed is:

1. A spindle unit comprising an outer casing, a spindle mounted in said outer casing so as to be axially movable within a predetermined range with respect to said outer casing, bearings for supporting said spindle, preload changeover means provided between said outer casing and said spindle for adjusting axial biasing forces applied to said bearings, and control means for adjusting the biasing force applied to said bearings by said preload changeover means according to the axial displacement of said spindle.

2. A spindle unit as claimed in claim 1 wherein said preload changeover means comprises an elastic member for biasing said bearings in a first axial direction, said elastic member having a rigidity relatively larger than the axial rigidity of said bearings, and a pressure chamber into which is introduced oil pressure for biasing said bearings in a second axial direction opposite to said first axial direction.

3. A spindle unit comprising an outer casing, a spindle mounted to extend through said outer casing, bearings for supporting said spindle, a bearing housing mounted in said outer casing for urging said bearings in an axial direction, an elastic member having a rigidity relatively larger than the axial rigidity of said bearings, a pressure chamber into which is introduced a pressure fluid, said bearing housing being urged in one axial direction by said elastic member and in the other axial direction by the fluid pressure in said pressure chamber, detecting means for detecting the displacement of said elastic member, and control means receiving signals from said detecting means and controlling the pressure level of the fluid to be introduced into said pressure chamber according to said signals.

4. A spindle unit comprising an outer casing, a spindle mounted to extend through said outer casing, bearings for supporting said spindle, a bearing housing mounted in said outer casing for urging said bearings in an axial direction, an elastic member having a rigidity relatively larger than the axial rigidity of said bearings, and a pressure chamber into which is introduced a pressure fluid, said bearing housing being urged in one axial direction by said elastic member and in the other axial direction by the fluid pressure in said pressure chamber, said elastic member being in contact with said bearing housing, a presser member detachably mounted on said bearing housing for pressing said elastic member against said bearing housing, said elastic member being located at one end of said outer casing when said spindle unit is assembled.

5. A spindle unit comprising an outer casing, a spindle mounted to extend through said outer casing, bearings for supporting said spindle, a bearing housing mounted in said outer casing for urging said bearings in an axial direction, an elastic member having a rigidity relatively larger than the axial rigidity of said bearings, a pressure chamber into which is introduced a pressure fluid, said bearing housing being urged in one axial direction by said elastic member and in the other axial direction by the fluid pressure in said pressure chamber, one of said outer casing and said bearing housing being provided at the boundary therebetween with a groove that surrounds said boundary, and means communicating with said groove for supplying a pressure fluid.

* * * * *